United States Patent
Hernandez

(10) Patent No.: US 6,513,279 B1
(45) Date of Patent: Feb. 4, 2003

(54) CHUM DISPENSER FOR FISHING

(76) Inventor: Carlos Hernandez, 10041 SW. 42nd Ter., Miami, FL (US) 33165

( * ) Notice: Subject to any disclaimer, the term of this patent is extended or adjusted under 35 U.S.C. 154(b) by 0 days.

(21) Appl. No.: 10/078,035

(22) Filed: Feb. 15, 2002

(51) Int. Cl.[7] .............................................. A01K 97/12
(52) U.S. Cl. .................................................... 43/44.99
(58) Field of Search ............................. 43/44.99, 42.06

(56) References Cited

U.S. PATENT DOCUMENTS

| | | | | |
|---|---|---|---|---|
| 1,258,890 | A | * | 3/1918 | Godfrey ..................... 43/44.99 |
| 1,306,758 | A | * | 6/1919 | Godfrey ..................... 43/44.99 |
| 1,807,712 | A | * | 6/1931 | Spofford .................... 43/44.99 |
| 2,729,912 | A | * | 1/1956 | Moffett ...................... 43/44.99 |
| 3,083,492 | A | * | 4/1963 | Kling ........................ 43/44.99 |
| 3,084,471 | A | * | 4/1963 | Alspaugh ................... 43/44.99 |
| 3,163,959 | A | * | 1/1965 | Hollar ....................... 43/44.99 |
| 3,499,526 | A | * | 3/1970 | Willinger ................... 43/44.99 |
| 4,017,999 | A | * | 4/1977 | Muko ........................ 43/44.99 |
| 4,051,620 | A | * | 10/1977 | Yasuda et al. ............. 43/44.99 |
| 4,065,870 | A | * | 1/1978 | Muko ........................ 43/44.99 |
| 4,138,794 | A | * | 2/1979 | Chiodini .................... 43/44.99 |
| 4,685,242 | A | * | 8/1987 | Stanish ...................... 43/44.99 |
| 5,913,672 | A | * | 6/1999 | Nicholson ................. 43/44.99 |
| 6,138,400 | A | * | 10/2000 | Gervae ...................... 43/44.99 |

FOREIGN PATENT DOCUMENTS

| | | | | |
|---|---|---|---|---|
| FR | 839461 | B1 | * | 4/1939 ................ 43/44.99 |
| FR | 993240 | B1 | * | 10/1951 ............... 43/44.99 |
| FR | 1188136 | B1 | * | 9/1959 ................ 43/44.99 |
| GB | 866858 | B1 | * | 5/1961 ................ 43/44.99 |
| GB | 1439585 | B1 | * | 6/1976 ................ 43/44.99 |
| GB | 2113511 | A1 | * | 8/1983 | |
| GB | 2178281 | A1 | * | 2/1987 ................ 43/44.99 |
| GB | 2265533 | A1 | * | 10/1993 | |
| GB | 2354147 | A1 | * | 3/2001 | |
| GB | 2355171 | A1 | * | 4/2001 | |
| IT | 530026 | B1 | * | 7/1955 ................ 43/44.99 |
| JP | 8-116846 | B1 | * | 5/1996 | |
| JP | 2001-245568 | B1 | * | 9/2001 | |

* cited by examiner

*Primary Examiner*—Darren W. Ark
(74) *Attorney, Agent, or Firm*—J. Sanchelima; A. Bordas

(57) ABSTRACT

A chum dispenser that houses chum for fishing applications. The instant invention is suspended by a rope and is submerged under water to a predetermined depth. It comprises a housing with first and second ends. The housing stores chum and has through holes to allow chum to seep out. The first end has a removable weighted end-cap and the second end has a flap assembly. The rope suspends the instant invention by the flap assembly. Flaps cover the second end of the housing when the instant invention is weighted down by the weighted end-cap. The flap assembly has springs attached to the housing that keep it partially open, exposing the second end of the housing and allowing the chum to exit therefrom when the rope is jerked by the user to overcome the weight of the weighted end-cap.

5 Claims, 4 Drawing Sheets

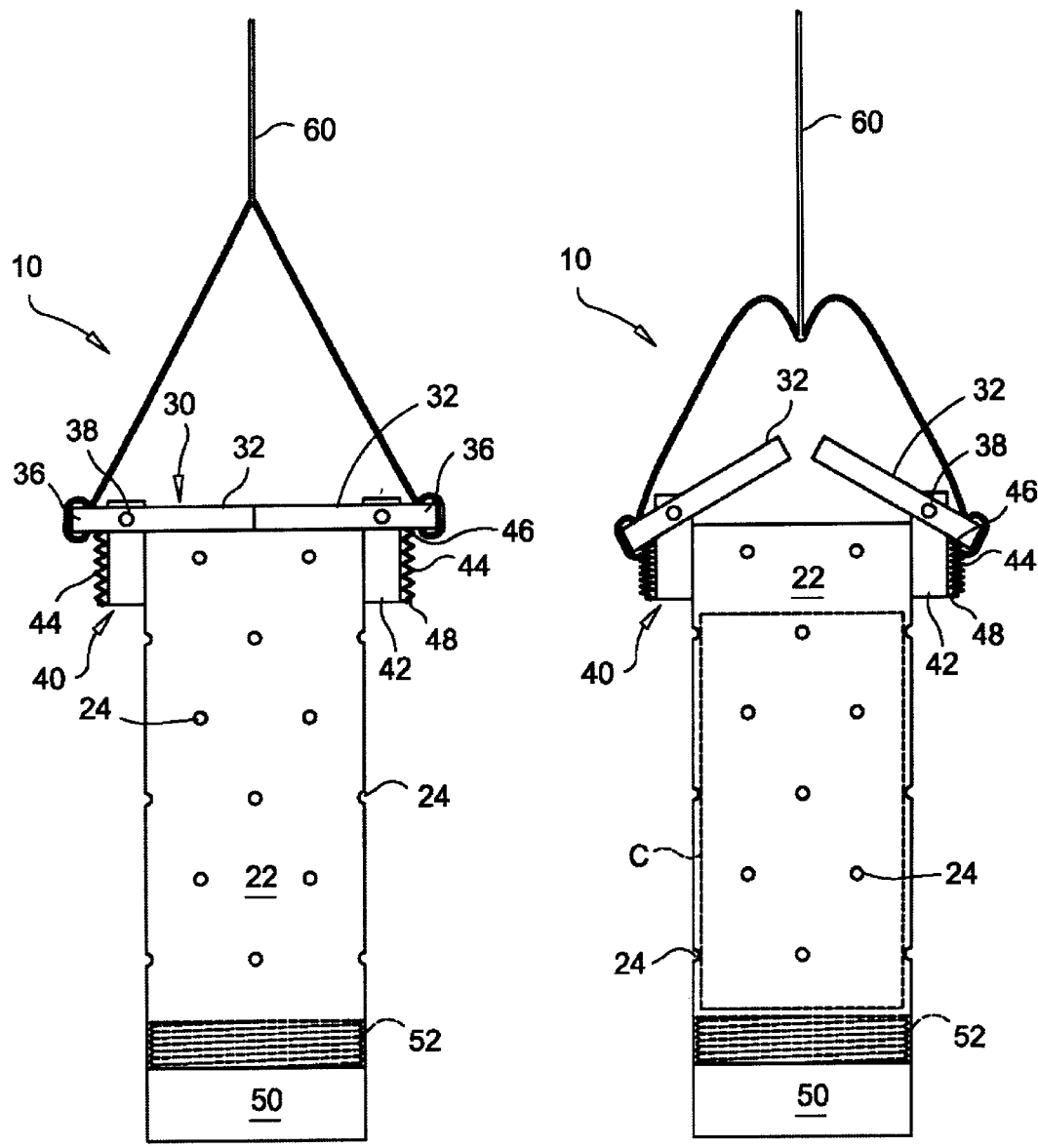
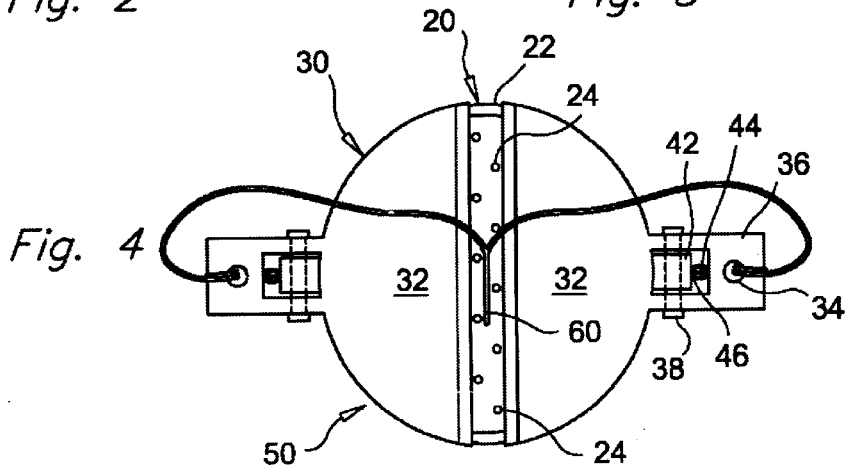
Fig. 2   Fig. 3
Fig. 4

CHUM DISPENSER FOR FISHING

BACKGROUND OF THE INVENTION

1. Field of the Invention

The present invention relates to an underwater dispenser, and more particularly, to a bait dispenser that houses chum for fishing applications.

2. Description of the Related Art

Many designs for bait and chum dispensers have been designed in the past. None of them, however, include a dispenser suspended by a rope that is submerged under water to a predetermined depth that comprises a housing with through holes, whereby the housing stores chum and has a flap assembly to release additional chum when desired. The instant invention easily lures fish to an immediate fishing area and prolongs the use of chum.

There are no chum dispensers to the best of applicant's knowledge, that allow a user to control the frequency and amount of chum to be released in a fishing application that also prolongs the use of chum.

SUMMARY OF THE INVENTION

A bait and chum dispenser. In the preferred embodiment, the instant invention is used in a marine application for fishing. The instant invention houses chum, which is defined as bait usually consisting of oily fish ground up. With the instant invention, the user may prolong the use of chum when fishing. A user may easily lure fish when chumming an immediate area of water.

The chum dispenser comprises a housing with first and second ends. The housing is substantially hollow to store chum and has at least one first through hole for the chum to seep out of. A weighted end-cap is removably secured and weighs down the housing. A flap assembly is suspended by a rope and covers the first end. The flap assembly has means to open and release chum wherein the flap assembly selectively opens the first end and has an unobstructed path to dispense the chum.

In greater detail, the housing has first and second ends. The housing is hollow to store chum and has at least one first through hole. The housing further comprises protrusions with third and fourth ends axially mounted at the first end, which each have second through holes.

The weighted end-cap is removably secured to the second end and has at least one third through hole.

The flap assembly is suspended by a rope and has first and second flaps with first and second arms, wherein the first and second flaps extend from the first and second arms. The first and second arms each have fourth and fifth through holes. The first and second flaps have cooperative dimensions to cover the first end. The first and second arms each have a notch of cooperative dimensions extending from the first and second flaps towards the fourth through holes a predetermined distance without reaching the fourth through holes, to receive the third ends of the protrusions. The second through holes align with the fifth through holes to receive a pin therethrough. The first and second arms each further have spring members secured to the fourth ends of the protrusions. The weighted end-cap causes the first and second flaps to close the first end and the spring members to stretch when the chum dispenser is weighed down by the weighted end-cap.

The instant invention also has means for opening the flap assembly upon the pins so that the first and second flaps selectively open the first end, having the unobstructed path to dispense the chum. The means for opening the flap assembly includes the rope secured to the fourth through holes of the first and second arms, so that a jerking force on the rope overcomes the weighted end-cap, opening the first and second flaps to release the chum from the first end.

More specifically, the chum dispenser comprises a housing with first and second ends, the housing being hollow to store chum and having a plurality through holes. The housing further comprises the protrusions with third and fourth ends axially mounted at the first end and the protrusions each having first through holes.

The weighted end-cap is removably secured to the second end and has at least one second through hole.

The flap assembly is suspended by a rope and has first and second flaps and first and second arms, wherein the first and second flaps extend from the first and second arms. The first and second arms each have third and fourth through holes. The first and second flaps have cooperative dimensions to cover the first end. The first and second arms each have a notch of cooperative dimensions extending from the first and second flaps towards the third through holes a predetermined distance without reaching the third through holes to receive the third ends of the protrusions. The first through holes align with the fourth through holes and receiving the pin therethrough. The first and second arms each further have spring members secured to the fourth ends of the protrusions. The weighted end-cap causes the first and second flaps to close the first end and the spring members to stretch when the chum dispenser is weighed down by the weighted end-cap.

The instant invention also includes means for opening the flap assembly upon the pins so that the first and second flaps selectively open the first end and having an unobstructed path to dispense the chum, wherein the means includes the rope secured to the third through holes of the first and second arms, so that a jerking force on the rope overcomes the weighted end-cap. This opens the first and second flaps to release the chum from the first end. In addition, chum seeps out of the plurality through holes and in the preferred embodiment, the housing is cylindrical.

It is therefore one of the main objects of the present invention to provide a chum dispenser that prolongs the use of chum when fishing.

It is another object of this invention to provide a chum dispenser that enables a user to easily lure fish to an immediate fishing area.

It is another object of the present invention to provide a chum dispenser that allows a user to control the amount of chum to be dispensed.

It is yet another object of the present invention to provide a chum dispenser that allows a user to control the frequency of chum release to be utilized while fishing.

It is still another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is an elevation view of the instant invention with the flap assembly in the closed position.

FIG. 3 is an elevation view of the instant invention with the flap assembly in the open position.

FIG. 4 shows a top view of the instant invention.

V. DETAILED DESCRIPTION OF THE PREFERRED EMBODIMENT

Figure 1:
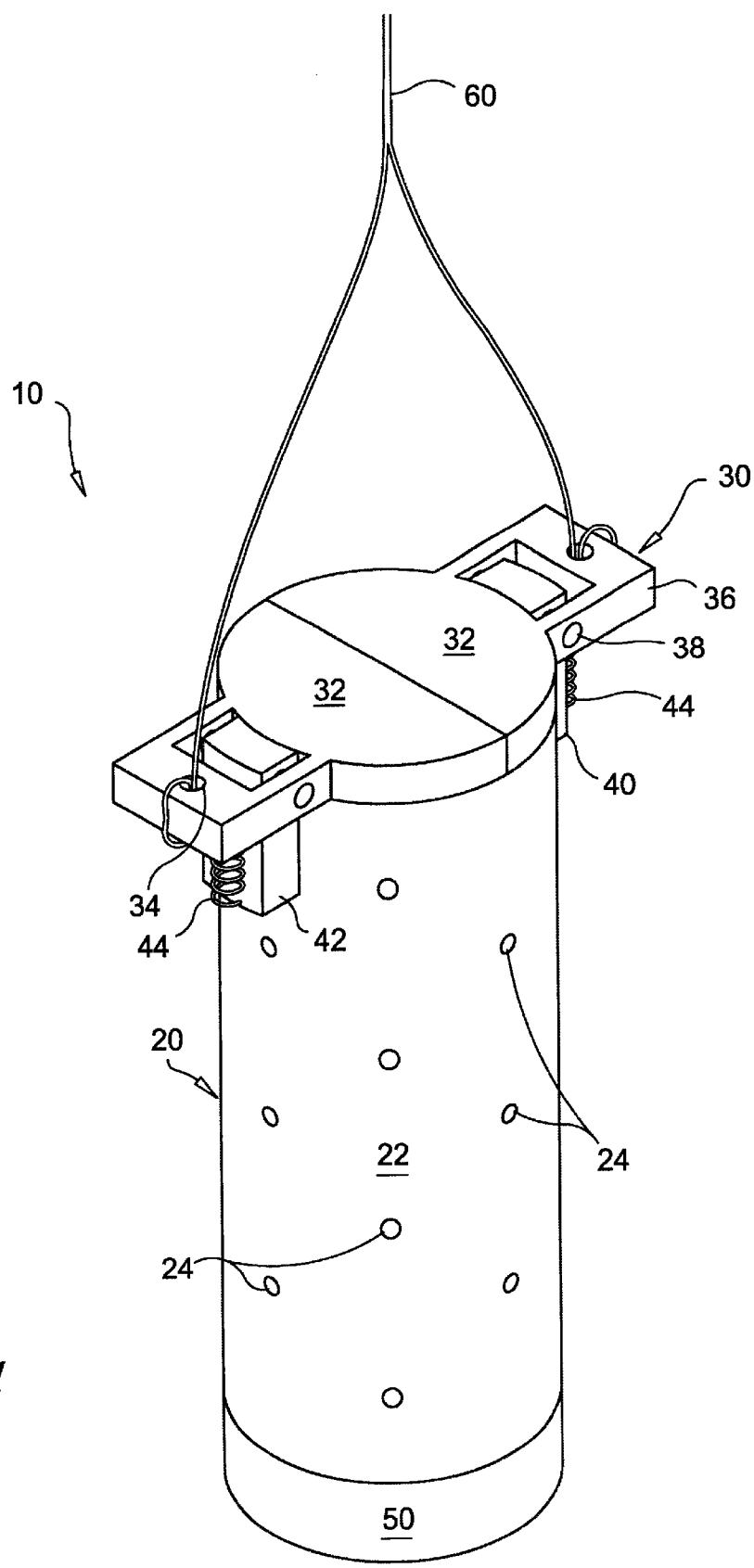
FIG. 1 represents a perspective view of the instant invention.

Referring now to the drawings, where the present invention is generally referred to with numeral 10, it can be observed that it basically includes housing assembly 20, flap assembly 30, shoulder assembly 40, and weighted end-cap 50.

As seen in FIG. 1, housing assembly 20 is generally cylindrically shaped in the preferred embodiment, having a top and bottom end. Housing assembly 20 comprises housing 22. Housing 22 stores chum C, seen in FIG. 3, within. Through holes 24 on housing 22 are of a predetermined size to enable chum C to seep out of housing assembly 20 when instant invention 10 is under water.

At the bottom end of housing assembly 20, is weighted end-cap 50. In the preferred embodiment, weighted end-cap 50 has threads 52, seen in FIG. 2, to screw into housing 22. Weighted end-cap 50 is of a durable material that is also resistant to water, and especially salt water. Such a durable material may be lead for example.

At the top end of housing assembly 20, is flap assembly 30. Flap assembly 30 comprises arms 36, which extend from flaps 32. Flaps 32, when in the closed position as illustrated, are shaped to cover the top of housing 22. Arms 36 have through holes 34 to enable rope 60 to be secured thereon.

Mounted onto housing 22 are shoulder assemblies 40. More specifically, shoulder assemblies 40 comprise shoulders 42, which are secured onto housing 22. Shoulders 42 have cooperative characteristics with flap assembly 30, whereby pins 38 trespass arms 36 and shoulders 42, securing them to each other.

As seen in FIG. 2, instant invention 10 is suspended by rope 60, which is secured onto arms 36 of flap assemblies 30. As best seen in this illustration, springs 44 have ends 46 and 48. Ends 46 are secured onto arms 36, and ends 48 are secured onto shoulders 42. While instant invention 10 is suspended, rope 60 has tension due to a downward force by weighted end-cap 50. With pins 38 as fulcrum points, and the weight of weighted end-cap 50 overcoming the spring force of springs 44, flaps 32 remain closed over the top of housing 22.

As seen in FIG. 3, instant invention 10 is suspended by rope 60. However, springs 44 are shown in their relaxed state because there is slack on rope 60. Slack may be given to rope 60 when a user jerks rope 60 in an upward and downward motion. In the relaxed state, the spring force of springs 44 force flaps 32 to lift from the top rim of housing 22 upon pins 38. In this position, chum C may escape from the top of housing 22. To place chum C in housing 22, weighted end-cap 50 is unscrewed from the bottom of housing 22. Once removed, chum C is packed within housing 22 and weighted end-cap 50 is replaced and tightened.

Seen in FIG. 4 are pins 38 trespassing arms 36 and shoulders 42. In addition, as best illustrated in this figure, weighted end-cap 50 also has through holes 24 to allow chum C to seep out.

Figure 5:
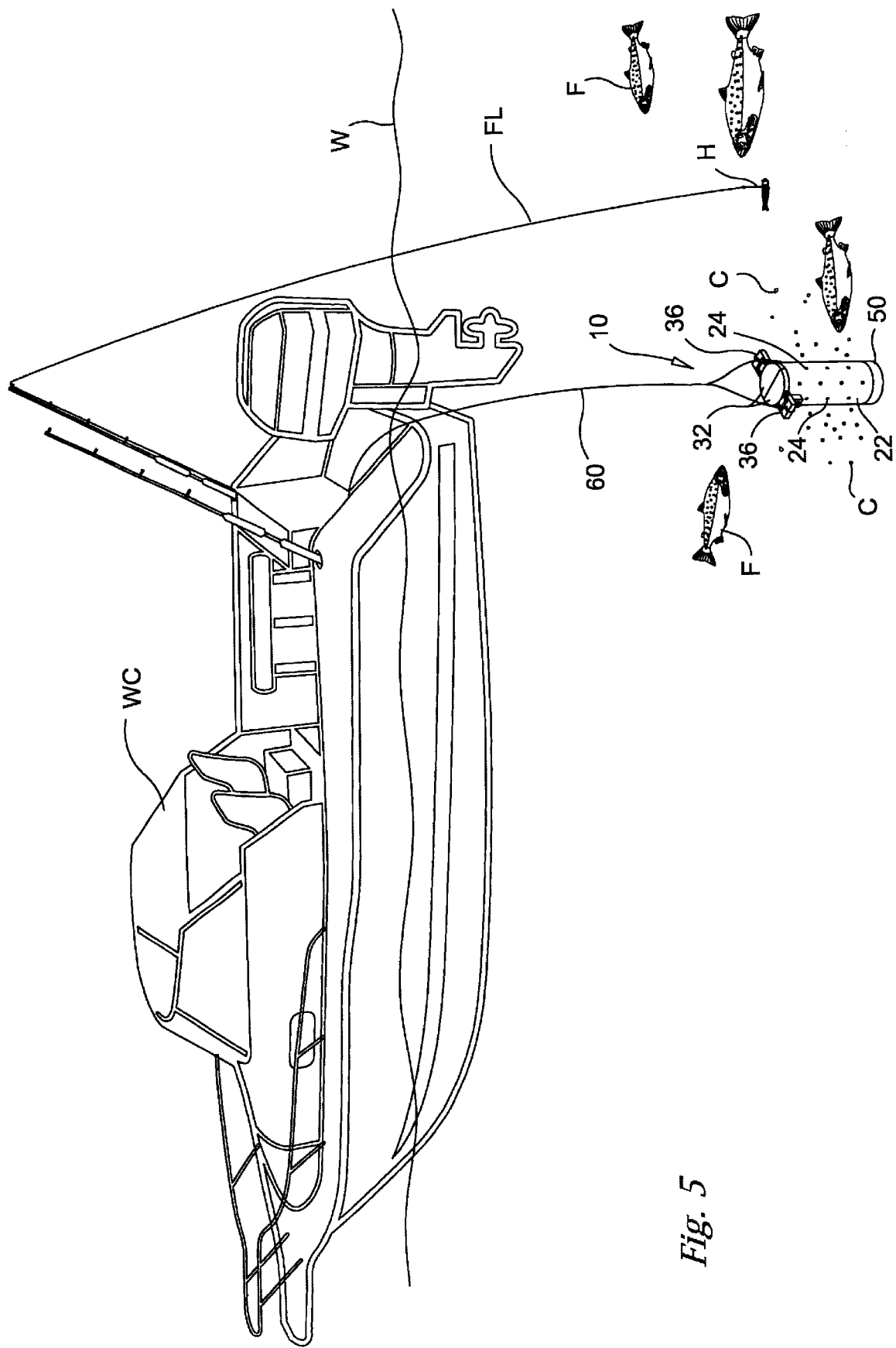
FIG. 5 illustrates a perspective view of the instant invention suspended from a watercraft.

FIG. 5 illustrates instant invention 10 lowered to a predetermined depth of water W from watercraft WC. Instant invention 10 is suspended by rope 60 and is weighed down by weighted end-cap 50. With flaps 32 closed, chum C slowly dissolves and escapes from housing 22 through through holes 24 to attract fish F and other marine life. From watercraft WC, a user may lower fishing line FL with its respective hook H to the vicinity of instant invention 10, in an effort to catch fish F that are lured to instant invention 10.

Figure 6:
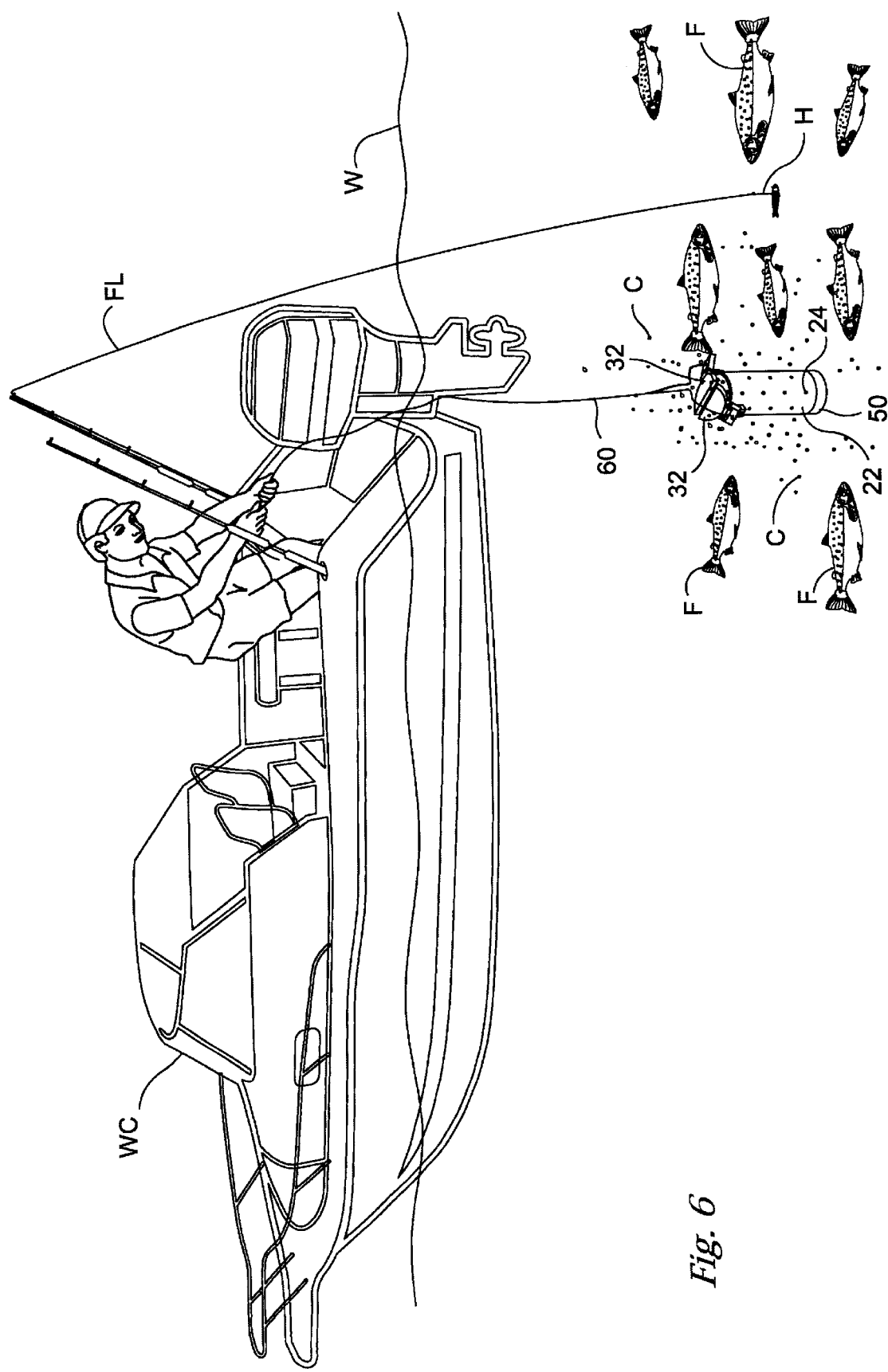
FIG. 6 is a perspective view of the instant invention suspended from a watercraft, with the flap assembly in the open position and chum escaping therefrom.

As seen in FIG. 6, if the user desires to attract more fish F to a fishing area, the user may handle rope 60 with quick upward and downward jerks. This action momentarily allows flaps 32 to open with the spring force of springs 44, seen in FIG. 3. Opening flaps 32 allows additional chum C to exit housing 22, thus allowing more chum C to be released and more fish F to be lured to instant invention 10.

With sufficient length of rope 60, instant invention 10 may be lowered to any depth in water W. A user may also utilize instant invention 10 to bottom fish on the floor of a body of water W. To release chum C with flaps 32, the user may simply rest instant invention 10 on the floor of body of water W, removing tension from rope 60. Simply elevating instant invention 10 above the floor of body of water W with rope 60, creates tension to overcome the spring force of springs 44, thus closing flaps 32 to conserve chum C.

Instant invention 10 need not be solely used from or with watercraft WC. Instant invention 10 may be suspended from a pier or any floating device where a person may fish. Such a floating device includes, but is not limited to, a barge, raft, or seaplane.

A user that is spear fishing may also use instant invention 10. Additionally, instant invention 10 may also be utilized to simply attract fish F. Such use of instant invention 10 may be for feeding fish F or enjoying fish watching as when scuba diving, snorkeling, or swimming.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A chum dispenser, comprising:

A) a housing with first and second ends, said housing being hollow to store chum and having at least one first through hole, said housing further comprising protrusions each with third and fourth ends axially mounted at said first end, said protrusions each having second through holes;

B) weighted end-cap removably secured to said second end, said weighted end-cap having at least one third through hole;

C) a flap assembly suspendable by a rope, said flap assembly having first and second flaps and first and second arms, wherein said first and second flaps extend from said first and second arms respectively, said first and second arms each having fourth and fifth through holes, said first and second flaps having cooperative dimensions to cover said first end, said first and second arms each having a notch of cooperative dimensions extending from said first and second flaps towards said fourth through holes a predetermined distance without reaching said fourth through holes to receive said third ends of said protrusions, said second through holes aligned with said fifth through holes and receiving pins therethrough, said first and second arms each further having spring members attached thereto and which are also secured to said fourth ends of said protrusions, said weighted end-cap causing said first and second flaps to close said first end and said spring members to stretch when said chum dispenser is weighed down by said weighted end-cap; and D) means for opening said flap assembly upon said pins so that said first and second flaps selectively open said first end and having an unobstructed pa th to dispense said chum.

2. The chum dispenser set forth in claim 1, wherein said means for opening said flap assembly includes said rope secured to said fourth through holes of said first and second arms, so that a jerking force on said rope overcomes said weighted end-cap, opening said first and second flaps to release said chum from said first end.

3. A chum dispenser, comprising:

A) a housing with first and second ends, said housing being hollow to store chum and having a plurality of through holes, said housing further comprising protrusions each with third and fourth ends axially mounted at said first end, said protrusions each having first through holes;

B) a weighted end-cap removably secured to said second end, said weighted end-cap having at least one second through hole;

C) a flap assembly suspendable by a rope, said flap assembly having first and second flaps and first and second arms, wherein said first and second flaps extend from said first and second arms respectively, said first and second arms each having third and fourth through holes, said first and second flaps having cooperative dimensions to cover said first end, said first and second arms each having a notch of cooperative dimensions extending from said first and second flaps towards said third through holes a predetermined distance without reaching said third through holes to receive said third ends of said protrusions, said first through holes aligned with said fourth through holes and receiving pins therethrough, said first and second arms each further having spring members attached thereto and which are also secured to said fourth ends of said protrusions, said weighted end-cap causing said first and second flaps to close said first end and said spring members to stretch when said chum dispenser is weighed down by said weighted end-cap; and D) means for opening said flap assembly upon said pins so that said first and second flaps selectively open said first end and having an unobstructed path to dispense said chum, wherein said means for opening said flap assembly includes said rope secured to said third through holes of said first and second arms, so that a jerking force on said rope overcomes said weighted end-cap, opening said first and second flaps to release said chum from said first end.

4. The chum dispenser set forth in claim 3, wherein said chum seeps out of said plurality of through holes.

5. The chum dispenser set forth in claim 4, wherein said housing is cylindrical.

* * * * *